May 31, 1966     F. T. KIERNAN ETAL     3,253,666

GROUND EFFECT MACHINES

Filed June 18, 1962     2 Sheets-Sheet 1

INVENTORS
F. T. KIERNAN
R. A. SHAW
F. A. H. ASHMEAD

BY Cameron, Kerkam + Sutton

Attorneys

May 31, 1966 F. T. KIERNAN ETAL 3,253,666
GROUND EFFECT MACHINES
Filed June 18, 1962 2 Sheets-Sheet 2

INVENTORS
F. T. KIERNAN
R. A. SHAW
F. A. H. ASHMEAD
By Cameron, Kerkam & Sutton
Attorneys

United States Patent Office 3,253,666
Patented May 31, 1966

---

3,253,666
GROUND EFFECT MACHINES
Francis Thomas Kiernan, Shortstown, Ronald Andrew Shaw, Hemel Hempstead, and Frederick Anthony Herbert Ashmead, Mannamead, Plymouth, England, assignors to National Research Development Corporation, London, England, a corporation of Great Britain
Filed June 18, 1962, Ser. No. 203,138
Claims priority, application Great Britain, June 19, 1961, 22,016/61
6 Claims. (Cl. 180—7)

The present invention is concerned with ground effect machines. A ground effect machine may be defined as a vehicle which, in operation, is at least partly supported above the surface (land or water) of the earth by a ground cushion, i.e. a cushion of pressurised air, produced beneath the vehicle. In particular the invention relates to ground effect machines of the type in which the ground cushion is at least partly bounded by a curtain of fluid discharged from the underside of the vehicle across the gap between the vehicle and the surface of the earth.

Essentially a ground effect machine comprises a platform which supports the crew accommodation, the necessary plant required to produce power for lift and propulsion and the useful load. It follows that the platform must be of a lightweight construction otherwise the power required to produce and maintain an adequate ground cushion would be prohibitive in relation to the useful load. Similarly, any superstructure required to increase the carrying capacity or enhance the protection to crew, passengers etc. must be within the inherent weight limits.

Although ground effect machines are like aircraft, in that they require lightweight structures, their structural requirements are different in many respects. Thus, an aircraft must have a rigid structure since, for aerodynamic reasons, angular deflections must be kept within very narrow limits notwithstanding the high manoeuvre loads which arise, while a very high factor of safety is essential since minor failures can lead to catastrophic damage. In contrast, in a ground effect machine much larger structural deflections can be tolerated, the manoeuvre loads cannot be very great, and the results of structural failure are in general likely to be less serious since the machine does not rise very far from the ground.

The present invention residues in the use, in ground effect machines particularly, though not exclusively, of the type referred to, of a lightweight construction to which adequate stress-bearing properties are imparted by a fluid under pressure contained within a part or parts of the structure.

With this form of structure advantage can be taken of the fact that many materials have greater tensile than compression strength. A small section can therefore support a greater load under tension than under compression e.g. a metal wire. Such tension members tend to give less rigidity than members loaded in compression which however have usually to be much more substantial or have additional stabilising members resulting in greater weight. Thus considerable saving of weight is achieved by the proposed construction whilst the lower rigidity is acceptable.

A ground effect machine according to the invention comprises a platform constituted by an inflatable member or members or flexible material surmounted by a cabin also of flexible material and having means for pressurising the cabin to a pressure at least equal to that of the ground cushion, the cabin being inflated and supported in use by the pressurisation.

Inflatable structure has found extensive use in such equipment as dinghies and portable buildings, but its use in aircraft has been limited by the considerations discussed above. However, as the structural requirements of ground effect machines are less stringent than in the case of aircraft, the possibility exists of achieving low structural weights by the use of this form of structure. Pressurising the cabin to match the cushion pressure has the effect of relieving differential pressures on the platform, which forms the load-carrying floor of the machine. It is also contemplated that it will be possible to collapse a machine according to the invention and pack it into a small space for transport. Further, the inflatable structure may also constitute flotation equipment for use in vehicles for travel over water.

According to a feature of the invention provision is made for supporting the load at least in part from the roof of the cabin.

According to another feature of the invention, the machine is provided with a power plant mounted in a rigid structure which is supported above the platform by the cabin pressurization, by rigid members, by further inflatable members of flexible material or by any combination of these means. In the case of inflatable members, these may be walls upstanding from the inflatable member or members defining the platform.

Figure 1:
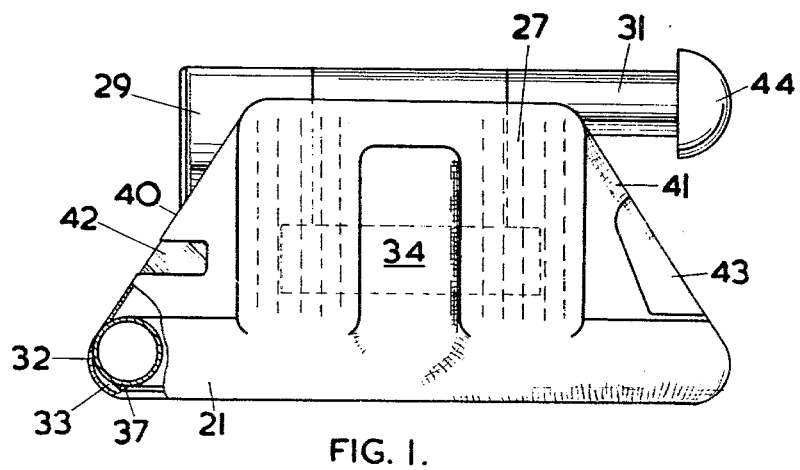
FIGURES 1 and 2 show the side and end elevations of a ground effect machine embodying the invention.
Figure 2:
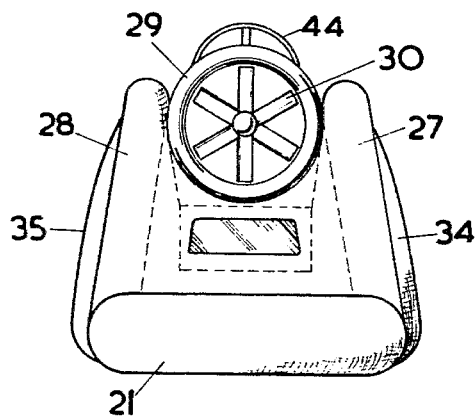
Figure 3:
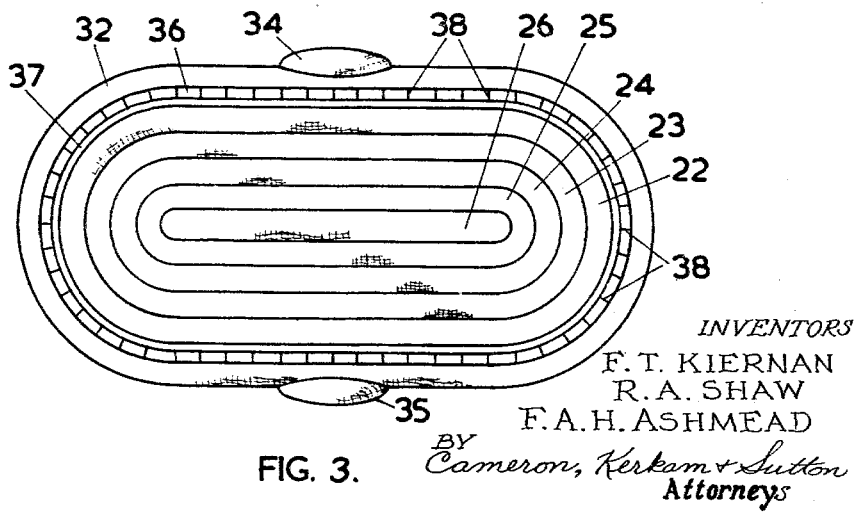
FIGURE 3 is an underneath plan view of the machine of FIGURES 1 and 2.

Referring now to FIGURES 1, 2 and 3, the machine shown comprises a platform 21 consisting of an elongated oval inflatable mattress of flexible material, the interior being sub-divided into annular compartments.

The mattress is effectively made up of an outer peripheral tube 22 (FIGURE 3) with a number of similar tubes 23, 24, 25 and 26 nested within it. Two longitudinal inflatable side walls 27, 28 are upstanding from the sides of the mattress, these walls also being made of flexible material and sub-divided internally into a number of compartments. The mattress and side walls have suitable connections of known type enabling them to be inflated by external means, such as a bellows pump, and then sealed against loss of inflation pressure. The walls carry between them a hammock (not shown) in which is supported a longitudinally extending circular section open-ended rigid duct 29, spaced above the mattress. The side walls are connected by webbing ties extending transversely between them just below the rigid tube. The ties prevent buckling of the walls under the duct weight, and also provide additional support for the duct.

A fan 30 is mounted within the forward end of the duct, and just downstream of the fan the duct is subdivided into three sections of generally trefoil form. The upper section is in communication with a discharge pipe 31 extending rearwardly within the duct, while the other two sections are connected to side outlets in the duct wall. An engine is mounted within the duct below the discharge pipe and drives the fan through a connecting shaft. This engine draws its air from the duct downstream of the fan.

A flexible peripheral wall or skirt 32 is secured at its upper edge to the periphery of the mattress and defines therewith a channel 33 which is connected to the above mentioned side outlets in the duct wall by means of flexible ducting 34, 35 passing through the longitudinal side walls. The lower edge of the flexible skirt and the adjacent surface of the mattress are shaped to define a downwardly and inwardly directed nozzle 36 through which part of the air from the fan is discharged, as indicated by the arrows, in the form of a curtain to retain the ground cushion whereby the vehicle is supported.

Figure 4:
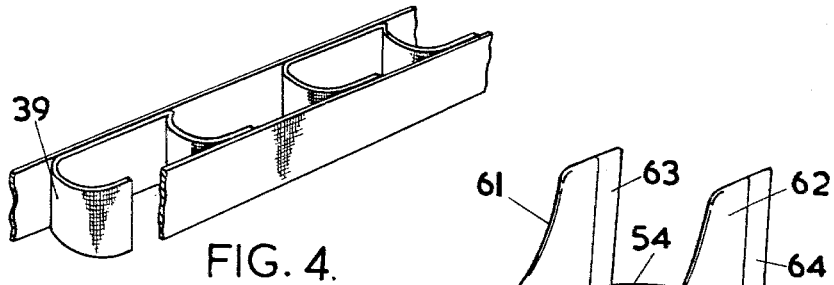
FIGURE 4 is a diagram showing an alternative arrangement of part of the same machine.

To ensure discharge of the curtain of fluid in the correct direction, the outer surface of the mattress adjacent the lower edge of skirt 32 is formed with a moulding 37 having a corner defining the edge of the nozzle. The lower edge of the peripheral skirt is laced to the corner of the moulding by cords 38 whereby the desired nozzle width is maintained. The lacing may be replaced by flexible diaphragms which can be formed as in FIGURE 4, wherein a strip of fabric 39 is attached alternately to the skirt and the mattress.

The space between the longitudinal side walls 27, 28 and under the rigid duct 29 is formed into a pressure tight cabin by sheets of flexible material 40, 41, extending between the walls across the ends and tops. In operation, this cabin is pressurized to or slightly above the pressure of the ground cushion so that the mattress which forms the floor of the vehicle is relieved of differential pressure loads. The sheet closing the forward end of the cabin includes a transparent window 42 for forward vision while a suitable airtight door 43 is provided in the sheet closing the rearward end.

Provision is made for bleeding pressure air from behind the fan to maintain pressure in the cabin.

The pressure in the cabin provides a substantial part of the support for the duct with the fan and power plant, and also for pay load which may be suspended from the duct as shown in broken lines in FIGURES 1 and 2. Thus it is possible to support the loads by members in tension, which is appropriate for fabric construction, rather than in compression. The difficulties of supporting concentrated loads on the mattress floor are also avoided.

When the cabin door is open for loading and unloading there is no cabin pressure to support the duct, but support is then afforded by the longitudinal side walls which, like the mattress, remain in an inflated condition.

As the duct, power plant and pay load are supported by flexible fabric structure, impact loads due to motion over rough ground or sea are relieved.

Since the pressure in the cabin can be the same as that of the ground cushion, the mattress floor can be formed with an aperture. In a vehicle intended for use over water, equipment might be lowered through this aperture for various purposes.

Forward propulsion of the vehicle is afforded by that part of the fan efflux discharge through the discharge pipe 31 referred to above. A Kitchin-type rudder 44 is provided on the end of the discharge pipe for steering, this being a well-known form of rudder utilized in power-driven marine craft, but which forms no part of the present invention. Auxiliary pressure sources are provided in the power plant for topping up the mattress and side wall pressures, and for control.

As mentioned above, the mattress and the longitudinal side walls are compartmented, and these compartments are such that puncture of one of them will not cause collapse of the structure.

Figure 5:
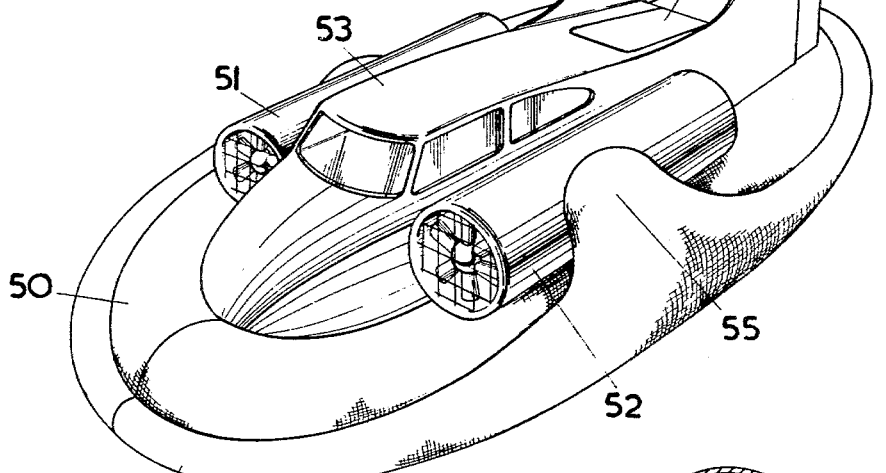
FIGURE 5 is a general view of a further ground effect machine embodying the inveniton.
Figure 6:
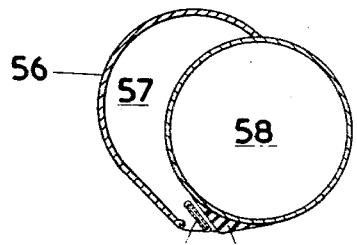
FIGURE 6 is a section of a detail of the machine shown in FIGURE 5.

Referring now to FIGURE 5, a ground effect machine comprises a platform 50 consisting of a mattress as heretofore described. Two rigid power ducts 51, 52 containing engine driven fans are mounted on the mattress on either side of a pressure tight cabin 53 provided with a loading door 54. The cabin may be of flexible material supported by stiffening members such as inflatable sidewalls, or it may be supported entirely by internal pressurization. Downstream of the fans the ducts are each subdivided into two sections so that part of the fans' efflux is discharged through the open after ends of the ducts for propulsion. The air in the remaining sections is directed to side outlets communicating with moulded flexible ducts (of which one, denoted by 55, is shown) which are extended to form a flexible peripheral skirt 56 secured at its upper edge to the periphery of the mattress and defining therewith a channel 57. This arrangement is shown in FIGURE 6 where 58 represents the outer tube of the mattress. A peripheral discharge nozzle is defined by the lower edge of the skirt and a moulding 59 attached to the mattress as in the previous example and the nozzle width is maintained in similar fashion. For control purposes a flexible inflatable bag 60 is positioned along one side of the nozzle. Air can be admitted to the interior of the bag which thus will be distended and hence vary the nozzle width. In a modification (not shown) the air bag could operate a hinged vane which can alter the direction of discharge of the air curtain or the nozzle width.

Referring again to FIGURE 5 the machine is provided with fins 61, 62 to assist directional stability, the said fins being fitted with rudders 63, 64 for steering purposes. Steering can also be effected by differential control of the propulsive efflux from the ducts 51, 52 either by variations of engine speeds or by throttling of the duct outlets.

Figure 7:
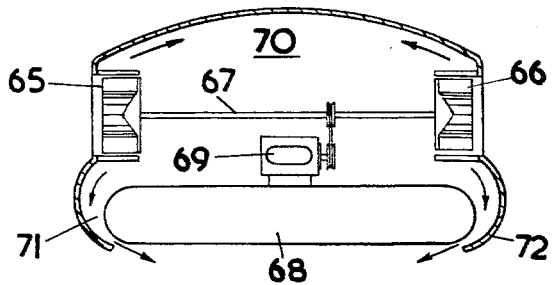
FIGURE 7 shows diagrammatically a modification of the machine shown in FIGURE 5.

In the machine of FIGURE 7, the ducts are replaced by two fans 65, 66 of the type in which air enters axially at the centre and is discharged radially outwards. These fans are mounted vertically in the sides of the cabin at each end of a horizontal shaft 67 supported above the platform mattress 68 and extending transversely of the machine. Power to drive the fans is supplied by an engine 69 carried on the mattress. The fans draw air from outside the machine and discharge it within the cabin for pressurization and to a duct formed between the mattress and a peripheral wall or skirt. The air is then discharged through a nozzle, formed by the surface of the mattress and the peripheral skirt as already described, to produce a curtain which will contain a ground cushion. Forward propulsion of the machine may be obtained by discharging a proportion of the air through suitably arranged and directed ducts, by an engine-driven propeller or other appropriate means.

We claim:
1. A ground effect machine comprising a platform constituted by a mattress of flexible material capable of being inflated and sealed against loss of inflation pressure, a flexible skirt having its upper edge secured to the periphery of the platform, the rest of said skirt being spaced from the outer surface of the platform and cooperating therewith to form a channel for fluid, a moulding fixed to the outer surface of the platform adjacent to and cooperating with the lower edge of the skirt to form a nozzle outlet from the channel, means for supplying fluid to the channel thence to be discharged through the nozzle, the nozzle being so shaped and arranged as to direct the fluid downwardly as a curtain so as to enclose a cushion of pressurised air between the platform and the surface over which the machine operates, a cabin of flexible material superimposed on the platform, and means for pressurising the cabin to a pressure at least equal to that of the cushion, which pressure serves to at least partially support the cabin.

2. A ground effect machine as claimed in claim 1 further comprising members of flexible material extending upwardly from the plaftorm capable of being inflated and sealed against loss of inflation pressure, said members serving when inflated to provide support for the cabin.

3. A ground effect machine as claimed in claim 1 wherein the mattress constituting the platform comprises a plurality of annular compartments.

4. A ground effect machine as claimed in claim 1 wherein means are provided to vary the volume of fluid discharge through the nozzle.

5. A ground effect machine as claimed in claim 4 wherein the said means comprises a flexible inflatable bag arranged to vary the nozzle width.

6. A ground effect machine comprising a platform constituted by at least one inflatable member of flexible material capable of being sealed against loss of pressure when inflated and serving as the floor of the machine, a cabin of flexible material superimposed on the platform, a flexible skirt secured at its upper edge to the periphery of the platform, the rest of said skirt being spaced from the outer surface of the platform and cooperating therewith to form a peripheral channel for fluid, a mounting fixed to the outer surface of the platform adjacent to and co-operating with the lower edge of the skirt to form a nozzle outlet from the channel, means for supplying fluid to the channel thence to be discharged through the nozzle, the nozzle being so shaped as to direct the fluid as a curtain across the gap between the platform and the surface over which the machine operates so as to maintain a cushion of pressurised air between the platform and the surface, a flexible inflatable bag mounted in said nozzle for varying the effective width of the nozzle and thereby varying the volume of fluid discharge through the nozzle, and means for pressurising the cabin to a pressure at least equal to that of the cushion, which pressure serves to at least partially support the cabin.

References Cited by the Examiner

UNITED STATES PATENTS

| | | | |
|---|---|---|---|
| 2,391,051 | 12/1945 | Windsor | 244—118 X |
| 2,466,779 | 4/1949 | Pevney | 244—118 X |
| 2,698,020 | 12/1954 | Phane | 244—117 X |
| 2,886,265 | 5/1959 | Ritter et al. | 244—117 |
| 2,941,762 | 6/1960 | Blair et al. | 244—117 |
| 3,055,613 | 9/1962 | Taylor | 244—12 |
| 3,083,934 | 4/1963 | Vanderlip | 244—5 |
| 3,139,947 | 7/1964 | Beardsley | 180—7 |

FOREIGN PATENTS

| | | |
|---|---|---|
| 219,133 | 11/1958 | Australia. |
| 860,781 | 2/1961 | Great Britain. |

OTHER REFERENCES

Design News, pages 6, 7, May 23, 1960.
Aviation Week, Mar 10, 1958, p. 25.

MILTON BUCHLER, *Primary Examiner.*

PHILIP ARNOLD, A. LARRY LEVY, *Examiners.*

L. C. HALL, *Assistant Examiner.*